United States Patent
Chaves et al.

(10) Patent No.: US 9,002,827 B2
(45) Date of Patent: Apr. 7, 2015

(54) DATABASE QUERY TABLE SUBSTITUTION

(75) Inventors: Michael Chaves, Cary, NC (US); Jason Figge, Cary, NC (US); Harold Lee, Holly Springs, NC (US)

(73) Assignee: Teradata US, Inc., Dayton, OH (US)

( * ) Notice: Subject to any disclaimer, the term of this patent is extended or adjusted under 35 U.S.C. 154(b) by 1335 days.

(21) Appl. No.: 11/775,905

(22) Filed: Jul. 11, 2007

(65) Prior Publication Data

US 2009/0019018 A1 Jan. 15, 2009

(51) Int. Cl.
*G06F 17/30* (2006.01)

(52) U.S. Cl.
CPC ................ *G06F 17/30466* (2013.01)

(58) Field of Classification Search
None
See application file for complete search history.

(56) References Cited

U.S. PATENT DOCUMENTS

| | | | |
|---|---|---|---|
| 5,091,852 A | | 2/1992 | Tsuchida et al. |
| 5,519,859 A | * | 5/1996 | Grace ................ 707/3 |
| 5,544,355 A | | 8/1996 | Chaudhuri et al. |
| 5,590,324 A | * | 12/1996 | Leung et al. ........... 707/5 |
| 5,737,592 A | | 4/1998 | Nguyen et al. |
| 7,275,072 B2 | * | 9/2007 | Kamada et al. ........... 1/1 |
| 2002/0184225 A1 | * | 12/2002 | Ghukasyan ........... 707/100 |
| 2005/0187977 A1 | * | 8/2005 | Frost ............... 707/104.1 |
| 2006/0015490 A1 | * | 1/2006 | Denuit et al. ............ 707/4 |

OTHER PUBLICATIONS

Microsoft Corporation, Optimizing Tables and Indexes, Jun. 21, 2007.

* cited by examiner

*Primary Examiner* — Jay Morrison
(74) *Attorney, Agent, or Firm* — Schwegman, Lundberg & Woessner P.A.

(57) ABSTRACT

The subject mater herein relates to requesting data from a database and, more particularly, to database query table substitution. Various embodiments provide systems, methods, and software to evaluate requests for data from a database and make table substitutions in the request to reduce a number of tables queried. Some embodiments include receiving a data request including data from two or more database table columns and building a list of all database tables specified in the data request. Some such embodiments further include, for each column in the data request, identifying each table from the list of all tables within which the column is present and identifying a least number of one or more tables that together include all of the columns of the data request. The data request may then be modified by changing the table of one or more of the columns in the received data requests.

17 Claims, 4 Drawing Sheets

DATABASE QUERY TABLE SUBSTITUTION

TECHNICAL FIELD

The subject mater herein relates to requesting data from a database and, more particularly, to database query table substitution.

BACKGROUND INFORMATION

In database systems, to query a database, a query is issued. A query is normally encoded in a query language, such as Structured Query Language ("SQL"). If a query is for data from more than one table, or selected as a function of data stored in one or more tables other than a table data is to be selected from, one or more table joins need to be made. Table joins are made on key columns of data shared between two or more tables. However, table joins are often expensive database transactions in terms of time and database management systems utilized to make joins.

There exist for some database management systems, such as database management systems available from Teradata, query generator tools. These tools receive as input, database table-column pairs for data a user wishes to obtain from the database. The query generator builds a query to fulfill the users request and typically returns a SQL statement string. It is common for queries generated using a query generator to invoke table joins to obtain the data.

Specifying the table(s) for non-key columns is normally a fairly trivial task. Normally, each piece of non-key column data is available from only one table, or a small number of tables in the case of summarized data. The one table, or limited number of tables, are usually known to the calling application or end-user along with the columns.

However, specifying the table or tables for key columns is a much more difficult task. A key column can legitimately appear in many tables. For instance, in a customer relationship management oriented database, a column INDIVIDUAL_ID key may appear in as many as half of the tables in the database. From an application's point of view, there is usually not a single, straightforward method of selecting the "best" instance of the data item.

Some applications and end-users issue SQL statements directly to a database, while others submit table and column pairs of data items to retrieve to a query generator. The query generator will then build a SQL statement, which when executed, will retrieve the data. However, the directly issued SQL statement and the table and column pairs submitted to a query generator often will not specify the "best" table to obtain the data from. Best may be considered to be a table chosen to minimize a number of joins necessary to fulfill a query. Often, unnecessary table joins are made.

DETAILED DESCRIPTION

Figure 1:
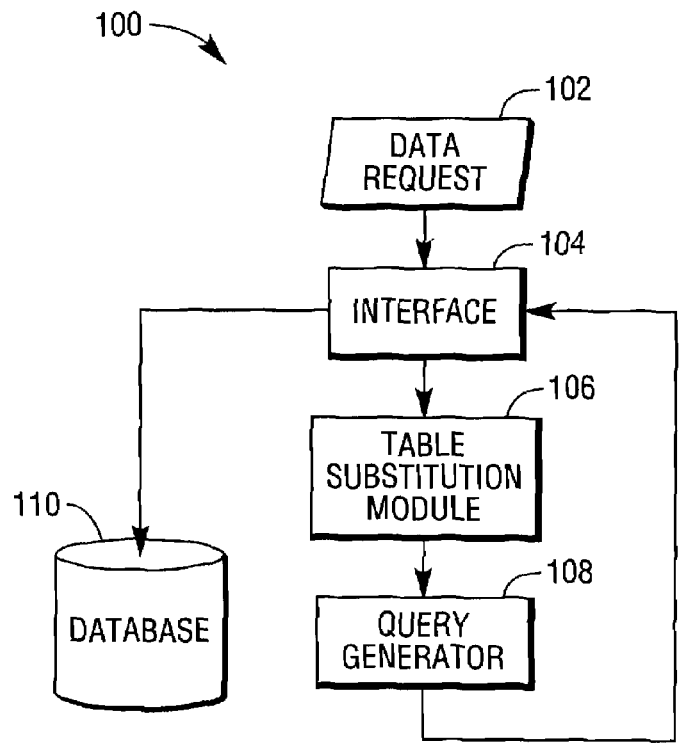
FIG. 1 is a logical block diagram of a system according to an example embodiment.

The systems, methods, and software described herein provide mechanisms, which in some embodiments, evaluate data request before being processed by a query generator to build a Structured Query Language ("SQL") statement. In other embodiments, a process may evaluate an SQL statement submitted to a database prior to execution of the statement. In yet further embodiments, the process may be embodied in another process, such as a computer code compiler. In each of these embodiments, the data request or SQL statement is evaluated to identify a least number of tables to join to obtain the requested data. These embodiments, and others, are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

In the various embodiments described herein, an element of software performs what may be referred to as a "table analysis." A table analysis looks at the possible table sources for each column involved in the data request to a query generator or a query to a database and determines the best combination of tables that supports every column in the query. Best may be considered to be a table chosen to minimize a number of joins necessary to fulfill a query or less expensive joins in terms of system resources and time necessary to perform the join. The result may be a substitution of one or more tables by one or more other tables holding the same data.

In many database systems, such as relational database management systems, data is arranged and stored in tables having columns and rows, referred to as records, of data. The data of one table may be related to the data of another table. Relations between tables may be defined using key columns. A key column in one table may be a column in another table. For instance, an employee record in an employee table may include a department column. However, a department may have many items of data defining the department. So another table with department data exists named department. A key column of the department table may be DEPT_ID. The DEPT_ID may also be stored in a column of the employee table. Thus, each employee record that includes a DEPT_ID is associated with a department record. The DEPT_ID column in the employee table is the key for linking the two tables. Tables may be joined together using such keys. The table analysis analyzes how joins between tables of a data request to a query generator of a query of a database are made.

In some embodiments, the table analysis first generates a unique list of all the tables specified in the data request to a query generator or in a database query. Call this the "total list of tables." Then for each column, the tables already specified for that column are compared to all the other tables in the total list of tables. If there is a direct join between the two tables, the one already specified for the current column and the one found in the total list of tables, which uses the current column then the table from the total list of tables is added to the list of tables for the current column. The join typically must be an equijoin and the tables typically must be interchangeable from a left, right, or full outer join standpoint.

This is may be illustrated with an example. Assume the following four tables are part of a larger database. Only the keys are shown, and all joins are between columns with the same name:

```
HOUSEHOLD_MASTER
    HH_ID (pk)
INDIVDUAL_MASTER
    IND_ID (pk)
    HH_ID (fk)
ACCOUNT_MASTER
    ACCT_ID (pk)
    IND_ID (fk)
TRANSACTION
    TRANS_ID (pk)
    ACCT_ID (fk)
    IND_ID (fk) (denormalized)
    HH_ID (fk) (denormalized)
```

If the calling program or user wanted a query which would return HH_ID, IND_ID, ACCT_ID, and TRANS_ID, the inputs to an automated query generator would be:

```
HH_ID from HOUSEHOLD_MASTER
IND_ID from INDIVIDUAL_MASTER
ACCT_ID from ACCOUNT_MASTER
TRANS_ID from TRANSACTION
```

(note that this is a very simple data request to select each key from the master table that defines the key).

The table substation, in some embodiments occurs as follows. First the total list of tables would be generated, it would contain: HOUSEHOLD_MASTER, INDIVDUAL_MASTER, ACCOUNT_MASTER, and TRANSACTION. Then based on the joins, the table list for each column would be modified to:

```
HH_ID
    HOUSEHOLD_MASTER (original)
        part of the original input
    INDIVIDUAL_MASTER (added)
because HOUSEHOLD_MASTER joins to INDIVIDUAL_MASTER
on HH_ID
    TRANSACTION (added)
because HOUSEHOLD_MASTER joins to TRANSACTION on HH_ID
IND_ID
    INDIVIDUAL_MASTER (original)
        part of the original input
    ACCOUNT_MASTER (added)
because INDIVIDUAL_MASTER joins to ACCOUNT_MASTER
on IND_ID
    TRANSACTION (added)
because INDIVIDUAL_MASTER joins to TRANSACTION on IND_ID
ACCT_ID
    ACCOUNT_MASTER (original)
        part of the original input
    TRANSACTION (added)
because ACCOUNT_MASTER joins to TRANSACTION on ACCT_ID
TRANS_ID
    TRANSACTION (original)
        part of the original input.
```

Note that no tables are added to TRANS_ID, as there are no joins between these tables using TRANS_ID.

The table analysis will then realize that ALL the columns are available from the transaction table, and a very simple query may be built.

```
SELECT HH_ID, IND_ID, ACCT_ID, TRANS_ID
    FROM TRANSACTION;
```

Figure 2:
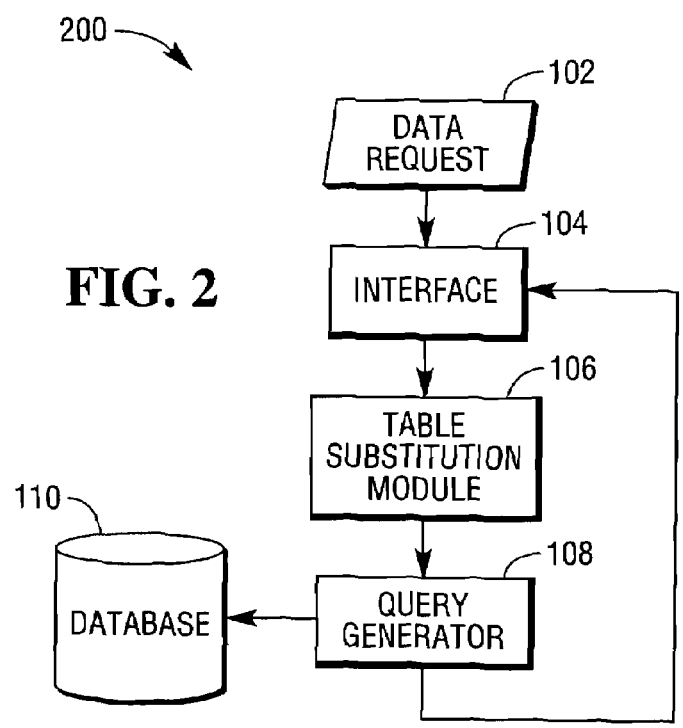
FIG. 2 is a logical block diagram of a system according to an example embodiment.
Figure 3:
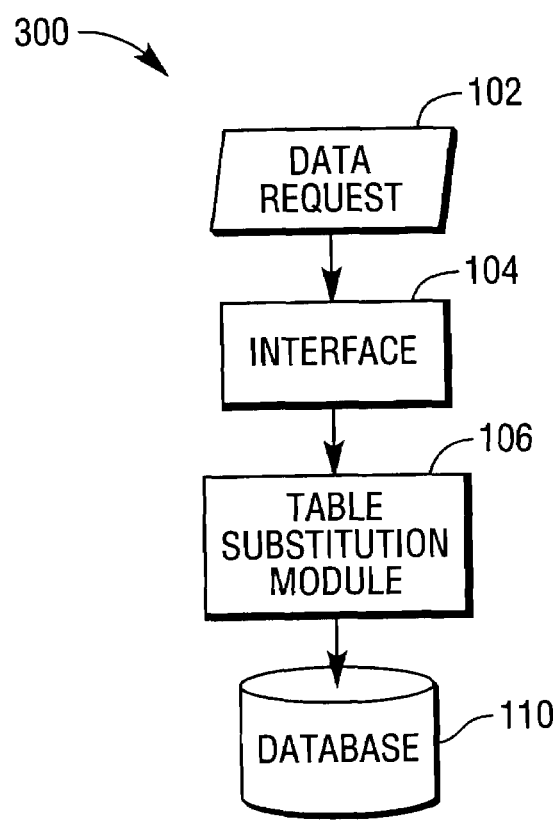
FIG. 3 is a logical block diagram of a system according to an example embodiment.

In various embodiments illustrated in FIG. 1, FIG. 2, FIG. 3, and other embodiments that are not illustrated, the table analysis may be performed on data requests submitted to a query generator, a query submitted in a query language, such as a form of Structured Query Language ("SQL"), a data request submitted over the Internet or other network in a mark up language, such as eXtensible Markup Language ("XML"), or queries submitted in other forms to other data processing elements.

FIG. 1 is a logical block diagram of a system 100 according to an example embodiment. The system 100 includes a data request 102 that is submitted to an interface 104. The interface forwards the data request 102 to a table substitution module 106 which performs the table analysis. After the table analysis is performed, the table substitution module 106 forwards the data request 102 to a query generator 108 that processes the data request 102 to build a query in a form, such as SQL, that may be processed by the database. The query generator 108 forwards the query to the interface 104. The interface 104 may then send the query to the database 110, schedule a time for the query to run against the database 110 at a future time, or send the query back to an originator of the data request 102.

Although the table substitution module 106 and the query generator 108 are illustrated as distinct processes, the table substitution module 106, in some embodiments, is a process within the query generator 108. However, in other embodiments the query generator 106 may be a module added on to an existing or other query generator 108 to enable one or more of the methods and processes described herein.

The database 110, in common embodiments, is a relational database under management of a database management system. The database 110 in such embodiments holds tables of data including columns and rows.

The table substitution module 106 is operative to process data requests 102 received via the interface 104 prior to retrieving data from the database 110 as a function of the data requests 102. The table substitution module 106 is operable to build a list of all database tables specified in a data request 102 and, for each column in the data request 102, identify each table from the list of all tables within which the column is present. The table substitution module 106 further identifies a least number of one or more tables that together include all of the columns of the data request 102 and modifies the data request 102, if few tables may be utilized to fulfill the data request 102, by changing the table of one or more of the columns in the received data request 102.

In some embodiments, the table substitution module 106, when identifying the least number of one or more tables that together include all of the columns of the data request 102 identifies two or more tables that may be joined. In these, and other embodiments, the interface 104 receives data requests 102 including database queries and the table substitution module 106 modifies such data requests by modifying the database queries.

FIG. 2 is a logical block diagram of a system 200 according to an example embodiment. The system 200 is similar to the system 100 of FIG. 1, except the query generator 108 may forward queries directly to the database 110 for execution or may schedule queries for later execution. In some embodiments, the query generator 108 may alternatively forward a built query to the interface 104 to return the query to an original data request 102 or query submitter. The original submitter, in various embodiments, may include a human end-user, a computer programming tool such as a compiler or report generation tool, a process of a computer application that directly accesses the database 110, or other computing tool, application, or process.

FIG. 3 is a logical block diagram of a system 300 according to another example embodiment. The system 300 is also similar to the system 100 of FIG. 1 and the system 200 of FIG. 2. However, in this embodiment, the table substitution module 106 receives the data request 102 via the interface 104 and issues the data request 102 directly to the database 110. In some such embodiments, the query generator 110 described above may be integrated within the table substitution module. In other embodiments, the data request may be an SQL query that the table substation module performs the table analysis on. In such embodiments, the table substitution module 106 may reduce the number of tables in the query to provide the queried data or determine the query is fine as is. For example, in some embodiments, if the SQL query is only for data from a single database 110 table, the table substitution module will not modify the SQL query. However, in some other embodiments, the table substitution module 106 may identify that one or more of the tables are highly utilized tables. If such an identification is made, the table substitution module may be configured to direct the query to one or more other tables that are not as highly utilized.

Figure 4:
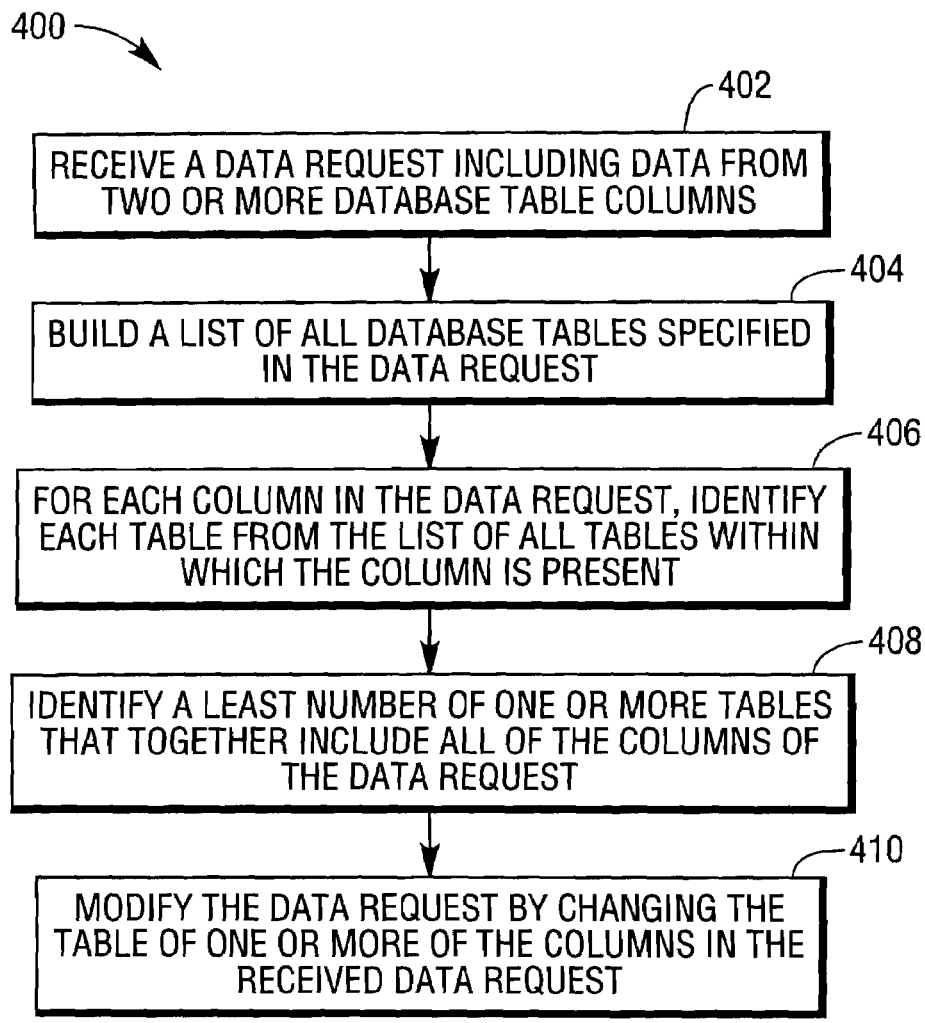
FIG. 4 is a block flow diagram of a method according to an example embodiment.

FIG. 4 is a block flow diagram of a method 400 according to an example embodiment. The method 400 is a computerized of evaluating and modifying a database data request. The example method 400 includes receiving a data request for data from two or more database table columns 402 building a list of all database tables specified in the data request 404. For each column in the data request, the method 400 identifies each table from the list of all tables within which the column is present 406 and identifies a least number of one or more tables that together include all of the columns of the data request 408. The method 400 may then modify the data request by changing the table of one or more of the columns in the received data request 410. In some embodiments, the identified tables within which a column is present 406 is a list of tables that are interchangeable and may be substituted for each other to provide data of the column. Modifying the data request 410 may include building a query as a function of the received data request and the identified least number of one or more tables.

Figure 5:
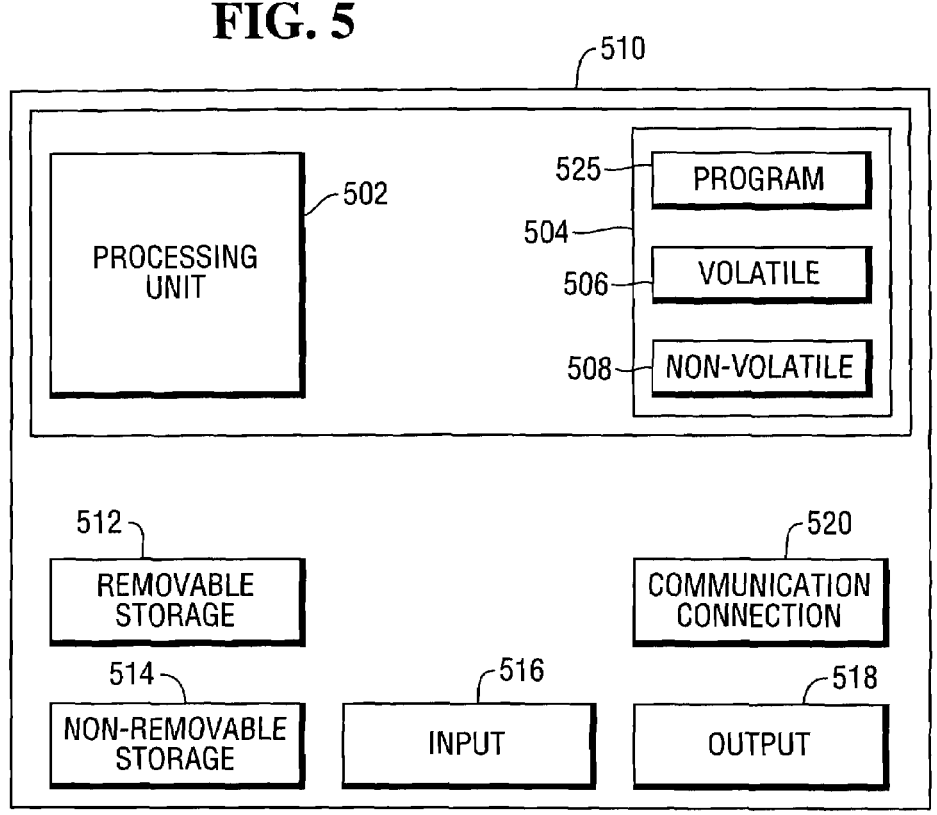
FIG. 5 is a logical block diagram of a computing device according to an example embodiment.

FIG. 5 is a logical block diagram of a computing device according to an example embodiment. One or more computing devices may be included in various embodiments. The software elements of FIG. 1, FIG. 2, and FIG. 3, such as the interface 104, table substation module 106, query generator 108, database 110 may execute on and store data in one or more computing devices such as that pictured in FIG. 5.

The computing device is a general purpose computing device. In various embodiments, the elements of the computing device may vary depending on the requirements of the specific embodiment. In one embodiment, multiple such computer systems are utilized in a distributed network to implement multiple components in a transaction based environment. An object oriented architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computerized method of evaluating and modifying a database data request, the method comprising:
    receiving a data request identifying data to retrieve from two or more database table columns from two or more database tables, the data request received as a Structured Query Language (SQL) statement;
    building, by executing instructions on a computer processor, a list in a memory device of all database tables specified in the data request;
    for each column in the data request, identifying each table from the list of all tables within which the column is present;
    determining if any of the identified tables are highly utilized tables;
    identifying a least number of one or more non-highly utilized tables that together include all of the columns of the data request; and
    modifying the SQL statement of the data request by changing the table of one or more of the columns in the received data request to use a least number of highly utilized tables possible.

2. The computerized method of claim 1, wherein identifying the least number of one or more tables that together include all of the columns of the data request includes identifying two or more tables that may be joined.

3. The computerized method of claim 1, wherein:
    receiving a data request includes receiving a database query; and
    modifying the data request includes modifying the database query.

4. The computerized method of claim 1, further comprising:
    forwarding the modified data request to a query generator to build a query encoded in a query language as a function of the data request.

5. The computerized method of claim 1, wherein the identified tables within which a column is present is a list of tables that are interchangeable and may be substituted for each other to provide data of the column.

6. The computerized method of claim 1, wherein modifying the data request includes building a query as a function of the received data request and the identified least number of one or more tables.

7. A system comprising:
    a processor;
    a memory device;
    a data storage device;
    a database to store tables on the data storage device, the data stored in the tables including columns and rows;
    an interface defined by instructions stored in the memory device and executable by the processor to receive data requests for data stored in the database;
    a table substitution module defined by instructions stored in the memory and executable by the processor to process data requests received via the interface prior to retrieving data as a function of the data requests, the instructions of the table substitution module executable by the processor to:
        build a list of all database tables specified in a data request, the data request received as a Structured Query Language (SQL) statement identifying data to retrieve from two or more database table columns from two or more database tables;
        for each column in the data request, identify each table from the list of all tables within which the column is present;
        determine if any of the identified tables are highly utilized tables;
        identify a least number of one or more non-highly utilized tables that together include all of the columns of the data request; and
        modify the SQL statement of the data request by changing the table of one or more of the columns in the received data request to use a least number of highly utilized tables possible.

8. The system of claim 7, wherein the table substitution module, when identifying the least number of one or more tables that together include all of the columns of the data request identifies two or more tables that may be joined.

9. The system of claim 7, wherein:
    the interface receives data requests including database queries; and
    the table substitution module modifies such data requests by modifying the database queries.

10. The system of claim 7, further comprising:
    a query generator to build a query statement encoded in a query language as a function of a data request; and
    wherein the table substitution module is further operable to:
        forward the modified data request to the query generator.

11. The system of claim 7, wherein the identified tables within which a column is present is a list of tables that are interchangeable and may be substituted for each other by the table substitution module to provide data of the column.

12. The system of claim 7, wherein the table substitution module, when modifying the data request, builds a query as a function of the received data request and the identified least number of one or more tables.

13. A non-transitory computer-readable storage medium, with instructions encoded and stored thereon, which when executed, cause a suitably configured computing system, including a database that holds data in tables having columns and rows, to:
    build a list of all database tables specified in a data request, the data request received as a Structured Query Language (SQL) statement identifying data to retrieve from two or more database table columns from two or more database tables;
    for each column in the data request, identify each table from the list of all tables within which the column is present;
    determine if any of the identified tables are highly utilized tables;
    identify a least number of one or more non-highly utilized tables that together include all of the columns of the data request; and modify the SQL statement of the data request by changing the table of one or more of the columns in the received data request to use a least number of highly utilized tables possible.

14. The non-transitory computer-readable storage medium of claim 13, wherein:
   the data request is a database query; and
   the instructions when further executed cause the suitably configured computing system to modify the data request by modifying the database query.

15. The non-transitory computer-readable storage medium of claim 13, wherein the instructions, when further executed, cause the suitably configured computing system to:
   forward the modified data request to a query generator to build a query encoded in a query language as a function of the data request.

16. The non-transitory computer-readable storage medium of claim 13, wherein the identified tables within which a column is present is a list of tables that are interchangeable and may be substituted for each other to provide data of the column.

17. The non-transitory computer-readable storage medium of claim 13, wherein the instructions to modify the data request include instructions to build a query as a function of the data request and the identified least number of one or more tables.

* * * * *